(12) United States Patent
Levit et al.

(10) Patent No.: US 7,740,741 B2
(45) Date of Patent: *Jun. 22, 2010

(54) PARA-ARAMID PULP INCLUDING META-ARAMID FIBRIDS AND PROCESSES OF MAKING SAME

(75) Inventors: Mikhail R. Levit, Glen Allen, VA (US); Achim Amma, Richmond, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 400 days.

This patent is subject to a terminal disclaimer.

(21) Appl. No.: 11/639,917

(22) Filed: Dec. 15, 2006

(65) Prior Publication Data

US 2007/0137818 A1 Jun. 21, 2007

Related U.S. Application Data

(60) Provisional application No. 60/752,281, filed on Dec. 21, 2005.

(51) Int. Cl.
*D21F 11/00* (2006.01)
*D21H 13/10* (2006.01)

(52) U.S. Cl. ................ 162/157.3; 162/141; 523/149

(58) Field of Classification Search ............. 162/141, 162/157.3; 523/149
See application file for complete search history.

(56) References Cited

U.S. PATENT DOCUMENTS 3,018,091 A    1/1962  Duggins
3,063,966 A    11/1962 Kwolek et al.
3,133,138 A    5/1964  Alexander, Jr.
3,756,908 A    9/1973  Gross
3,767,756 A    10/1973 Blades
3,869,430 A    3/1975  Blades
4,472,241 A    9/1984  Provost
4,533,724 A *  8/1985  Wolfe et al. .............. 528/313
4,698,267 A *  10/1987 Tokarsky ................. 428/474.4
5,023,035 A *  6/1991  Yang ......................... 264/184
5,811,042 A    9/1998  Hoiness
5,833,807 A *  11/1998 Ramachandran et al. . 162/157.3
2003/0022961 A1* 1/2003 Kusaka et al. .............. 523/152

FOREIGN PATENT DOCUMENTS

CN   1683712 A    * 10/2005
EP   0 129 412 A2   12/1984
EP   0 392 559 A2   10/1990
JP   06240596 A   *  8/1994
WO   WO9317856    *  9/1993
WO   WO 2005/103376 A1  11/2005
WO   WO 2006/012042 A1   2/2006

OTHER PUBLICATIONS

Research Disclosure 19037.

* cited by examiner

*Primary Examiner*—Eric Hug
*Assistant Examiner*—Jacob Thomas Minskey (57) ABSTRACT

The present invention relates to para-aramid pulp including meta-aramid fibrids for use as reinforcement material in products including for example friction materials, fluid sealing materials, and papers. The invention further relates to processes for making such pulp.

11 Claims, 2 Drawing Sheets

PARA-ARAMID PULP INCLUDING META-ARAMID FIBRIDS AND PROCESSES OF MAKING SAME

BACKGROUND OF THE INVENTION

1. Field of the Invention

This invention relates to para-aramid pulp including meta-aramid fibrids for use as reinforcement material in products including for example friction materials, fluid sealing materials, and papers. The invention further relates to processes for making such pulp.

2. Description of Related Art

Fibrous and non fibrous reinforcement materials have been used for many years in friction products, sealing products and other plastic or rubber products. Such reinforcement materials typically must exhibit high wear and heat resistance.

Asbestos fibers have historically been used as reinforcement materials, but due to their health risks replacements have been made or proposed. However, many of these replacements do not perform as well as asbestos in one way or another.

Research Disclosure 74-75, published February 1980, discloses the manufacture of pulp made from fibrillated KEVLAR® brand para-aramid fibers of variable lengths and use of such pulp as a reinforcement material in various applications. This publication discloses that pulp made from KEVLAR® brand para-aramid fibers can be used in sheet products alone, or in combination with fibers of other materials, such as NOMEX® brand meta-aramid, wood pulp, cotton and other natural celluloses, rayon, polyester, polyolefin, nylon, polytetrafluoroethylene, asbestos and other minerals, fiberglass and other ceramics, steel and other metals, and carbon. The publication also discloses the use of pulp from KEVLAR® brand para-aramid fiber alone, or with KEVLAR® brand para-aramid short staple, in friction materials to replace a fraction of the asbestos volume, with the remainder of the asbestos volume being replaced by fillers or other fibers.

U.S. Pat. No. 5,811,042 (to Hoiness) discloses a composite friction or gasketing material made of a thermoset or thermoplastic matrix resin, fiber reinforcing material, and substantially fibril free aramid particles. Poly(p-phenylene terephthalamide) and poly(m-phenylene isophthalamide) are preferred fiber reinforcing materials, and the fibers can be in the form of floc or pulp.

U.S. Pat. No. 4,472,241 to Provost discloses a process for preparation of an aqueous suspension of aramid fibrids and aramid floc, suitable for the preparation of paper or pressboard. This disclosure teaches that a suspension of meta-aramid floc and meta-aramid fibrids can be refined together without damage to the meta-aramid floc. Meta-aramid floc, also, does not fibrillate and does not form a pulp like para-aramid floc does when refined.

U.S. Patent Application Publication 2003/0022961 (to Kusaka et al.) discloses friction materials made from a friction modifier, a binder and a fibrous reinforcement made of a mixture of (a) a dry aramid pulp and (b) wet aramid pulp, wood pulp or acrylic pulp. Dry aramid pulp is defined as an aramid pulp obtained by "the dry fibrillation method". The dry fibrillation method is dry milling the aramid fibers between a rotary cutter and a screen to prepare the pulp. Wet aramid pulp is defined as an aramid pulp obtained by "the wet fibrillation method". The wet fibrillation method is milling short aramid fibers in water between two rotary discs to form fibrillated fibers and then dehydrating the fibrillated fibers, i.e., the pulp. Kusaka et al further disclose a method of mixing fibrillating fibers by first mixing plural types of organic fibers that fibrillate at a definite ratio, and then fibrillating the mixture to produce a pulp.

There is an ongoing need to provide alternative reinforcing materials that both perform well in products, such as fluid seals and friction applications, and that are low in cost. Despite the numerous disclosures proposing lower cost alternative reinforcement materials, many of these proposed products do not adequately perform in use, cost significantly more than currently commercial products, or have other negative attributes. As such, there remains a need for reinforcement materials that exhibit high wear and heat resistance that is comparable or less expensive than other commercially available reinforcement materials.

BRIEF SUMMARY OF THE INVENTION

This invention relates to a process for making a para-aramid pulp including meta-aramid fibrids for use as reinforcement material, comprising:
(a) combining pulp ingredients including:
 (1) never-dried meta-aramid fibrids having an average maximum dimension of 0.2 to 1 mm, a ratio of maximum to minimum dimension of 5:1 to 10:1, and a thickness of no more than 2 micrometers, and being a 10 to 90 weight percent of the total solids in the ingredients;
 (2) para-aramid fiber being 10 to 90 weight percent of the total solids in the ingredients, and having an average length of no more than 10 cm; and
 (3) water being 95 to 99 weight percent of the total ingredients;
(b) mixing the ingredients to a substantially uniform slurry;
(c) co-refining the slurry by simultaneously:
 (1) shearing and/or masticating the meta-aramid fibrids into fibril-free refined meta-aramid fibrids having an average maximum dimension of 0.1 to 0.5 mm;
 (2) fibrillating, cutting and masticating the para-aramid fiber to irregularly shaped fibrillated fibrous structures; and
 (3) dispersing all solids such that the refined slurry is substantially uniform; and
(d) removing water from the refined slurry,
thereby producing a meta- and para-aramid pulp with the para-aramid fibrous structures contacting and wrapped partially around at least some of the refined meta-aramid fibrids.

The invention is further related to a process for making a para-aramid pulp including meta-aramid fibrids for use as reinforcement material, comprising:
(a) combining ingredients including water and a first material of the group:
 (1) never-dried meta-aramid fibrids having an average maximum dimension of 0.2 to 1 mm, a ratio of maximum to minimum dimension of 5:1 to 10:1, and a thickness of no more than 2 micrometers and being 10 to 90 weight percent of the total solids in the pulp; and
 (2) para-aramid fiber being 10 to 90 weight percent of the total solids in the pulps, and having an average length of no more than 10 cm;
(b) mixing the ingredients to a substantially uniform suspension;
(c) refining the mixed suspension by:
 (1) shearing and/or masticating at least some of the meta-aramid fibrids; or
 (2) fibrillating, cutting and masticating at least some of the para-aramid fiber to irregularly shaped fibrillated fibrous structures;

(d) combining ingredients including the refined suspension, the second material of the group of (a)(1 and 2), and water, if necessary, to increase the water concentration to 95-99 weight percent of the total ingredients;
(e) mixing the ingredients, if necessary, to form a substantially uniform slurry;
(f) co-refining the slurry by simultaneously:
  (1) shearing and/or masticating at least some of any remaining never-dried meta-aramid fibrids having an average maximum dimension of 0.2 to 1 mm, a ratio of maximum to minimum dimensions of 5:1 to 10:1, and a thickness of no more than 2 micrometers, such that all or substantially all of the never-dried meta-aramid fibrids are size-reduced into fibril free, meta-aramid refined fibrids having an average maximum dimension of 0.1 to 0.5 mm, and
  (2) fibrillating, cutting and masticating at least some of the para-aramid fiber such that all or substantially all of the para-aramid fiber is converted to irregularly shaped fibrillated fibrous structures; and
  (3) dispersing all solids such that the refined slurry is substantially uniform; and
(g) removing water from the refined slurry,
thereby producing a meta- and para-aramid pulp with the para-aramid fibrous structures contacting and wrapped partially around at least some of the meta-aramid refined fibrids.

The invention is further directed to an aramid pulp made from the process of this invention and a paper comprising that pulp.

Moreover, this invention is directed to a friction material comprising a friction modifier, a binder, a filler, and an aramid pulp made from the process of this invention; and a fluid sealing material such as a gasket comprising a binder, a filler, and an aramid pulp made from the process of this invention.

BRIEF DESCRIPTION OF THE DRAWING(S)

The invention can be more fully understood from the following detailed description thereof in connection with accompanying drawings described as follows.

GLOSSARY

Before the invention is described, it is useful to define certain terms in the following glossary that will have the same meaning throughout this disclosure unless otherwise indicated.

"Maximum dimension" of an object means the straight distance between the two most distal points from one another in the object.

"Aspect ratio" of an object means the maximum dimension of the object, divided by the maximum width of that object in any plane containing the maximum dimension where the maximum width is perpendicular to the maximum dimension.

"Fiber" means a relatively flexible, unit of matter having a high ratio of length to width across its cross-sectional area perpendicular to its length. Herein, the term "fiber" is used interchangeably with the term "filament" or "end". The cross section of the filaments described herein can be any shape, but are typically circular or bean shaped. Fiber spun onto a bobbin in a package is referred to as continuous fiber or continuous filament or continuous filament yarns. Fiber can be cut into short lengths called staple fiber. Fiber can be cut into even smaller lengths called floc. Yarns; multifilament yarns or tows comprise a plurality of fibers. Yarn can be intertwined and/or twisted.

"Fibrid" means non-granular, fibrous or film-like, particles. Preferably, they have a melting point or decomposition point above 320° C. Fibrids are not fibers, but they are fibrous in that they have fiber-like regions connected by webs. Fibrids have an average length of 0.2 to 1 mm with an aspect ratio of 5:1 to 10:1. The thickness dimension of the fibrid web is less than 1 or two micrometers and typically on the order of a fraction of a micrometer. Fibrids, before being dried, can be used wet and can be deposited as a binder physically entwined about other ingredients or components of a product. The fibrids can be prepared by any method including using a fibridating apparatus of the type disclosed in U.S. Pat. No. 3,018,091 where a polymer solution is precipitated and sheared in a single step.

"Fibril" means a small fiber having a diameter as small as a fraction of a micrometer to a few micrometers and having a length of from about 10 to 100 micrometers. Fibrils generally extend from the main trunk of a larger fiber having a diameter of from 4 to 50 micrometers. Fibrils act as hooks or fasteners to ensnare and capture adjacent material. Some fibers fibrillate, but others do not or do not effectively fibrillate and for purposes of this definition such fibers do not fibrillate. Poly (para-phenylene terephthalamide) fiber fibrillates readily upon abrasion, creating fibrils. Poly(meta-phenylene isophthalamide) fiber does not fibrillate.

"Fibrillated fibrous structures" means particles of material having a stalk and fibrils extending therefrom wherein the stalk is generally columnar and about 10 to 50 micrometers in diameter and the fibrils are hair-like members only a fraction of a micrometer or a few micrometers in diameter attached to the stalk and about 10 to 100 micrometers long.

"Papers" means flat sheets producible on a paper machine, such as a Fourdrinier or inclined-wire machine.

"Floc" means short lengths of fiber, shorter than staple fiber. The length of floc is about 0.5 to about 15 mm and a diameter of 4 to 50 micrometers, preferably having a length of 1 to 12 mm and a diameter of 8 to 40 micrometers. Floc that is less than about 1 mm does not add significantly to the strength of the material in which it is used. Floc or fiber that is more than about 15 mm often does not function well because the individual fibers may become entangled and cannot be adequately and uniformly distributed throughout the material or slurry. Aramid floc is made by cutting aramid fibers into short lengths without significant or any fibrillation, such as those prepared by processes described in U.S. Pat. Nos. 3,063,966, 3,133,138, 3,767,756, and 3,869,430.

"Arithmetic" average length means the calculated length from the following formula:

$$\text{Arithmetic length} = \frac{\sum [(\text{Each Individual pulp length})]}{\sum [\text{Individual pulp count}]}$$

"Length-weighted average" length means the calculated length from the following formula:

$$\text{Length-weighted average length} = \frac{\sum [(\text{Each Individual pulp length})^2]}{\sum [\text{Each Individual pulp length}]}$$

"Weight-weighted average" length means the calculated length from the following formula:

$$\text{Weight-weighted average length} = \frac{\sum [(\text{Each Individual pulp length})^3]}{\sum [(\text{Each Individual pulp length})^2]}$$

"Maximum dimension" of an object means the straight distance between the two most distal points from one another in the object "Staple fiber" can be made by cutting filaments into lengths of no more than 15 cm, preferably 3 to 15 cm; and most preferably 3 to 8 cm. The staple fiber can be straight (i.e., non crimped) or crimped to have a saw tooth shaped crimp along its length, with any crimp (or repeating bend) frequency. The fibers can be present in uncoated, or coated, or otherwise pretreated (for example, pre-stretched or heat-treated) form.

DETAILED DESCRIPTION OF THE INVENTION

The invention is directed to processes for making para-aramid pulp including meta-aramid fibrids for use as reinforcement material in products including for example friction materials, fluid sealing materials, and papers.

I. First Embodiment of the Inventive Process

In a first embodiment, the process for making a meta- and para-aramid pulp comprises the following steps. First, pulp ingredients are combined or added together in a container. Second, the combined pulp ingredients are mixed to a substantially uniform slurry. Third, the slurry is simultaneously refined or co-refined. Fourth, water is removed from the refined slurry.

Combining Step

In the combining step, the pulp ingredients are preferably added together in a vessel or container. The pulp ingredients include (1) meta-aramid fibrids, (2) para-aramid fiber, (3) optionally other minor additives, and (4) water.

Meta-Aramid Fibrids

The meta-aramid fibrids are added to a concentration of 10 to 90 wt % of the total solids in the ingredients, preferably 25 to 60 wt % of the total solids in the ingredients, and most preferably 25 to 55 wt % of the total solids in the ingredients. The meta-aramid fibrids preferably has an average maximum dimension of no more than about 1 mm, more preferably about 0.2 to 1 mm. The meta-aramid fibrids are substantially or completely fibril free and have an aspect ratio (the ratio of maximum to minimum dimension) of 5:1 to 10:1, and a thickness of no more than 1 micrometer. More preferably, the meta-aramid fibrids have a thickness of 0.1-0.5 micrometer.

Para-Aramid Fiber

The para-aramid fiber is added to a concentration of 10 to 90 wt % of the total solids in the ingredients, preferably 40 to 75 wt % of the total solids in the ingredients, and most preferably 40 to 55 wt % of the total solids in the ingredients. The para-aramid fiber preferably has a linear density of no more than 10 dtex, more preferably 0.5 to 10 dtex, and most preferably, 0.8 to 2.5 dtex. The para-aramid fiber also preferably has an average length along its longitudinal axis of no more than 10 cm, more preferably an average length of 0.65 to 2.5 cm, and most preferably an average length of 0.65 to 1.25 cm.

Polymer

Polymers suitable for use in making the aramid fibrids and aramid fiber used in this invention are synthetic aromatic polyamides. The polymers must be of fiber-forming molecular weight in order to be shaped into fibers. The polymers can include polyamide homopolymers, copolymers, and mixtures thereof which are predominantly aromatic, wherein at least 85% of the amide (—CONH—) linkages are attached directly to two aromatic rings. The rings can be unsubstituted or substituted. The polymers are meta-aramid when the two rings or radicals are meta oriented with respect to each other along the molecular chain. The polymers are para-aramid when the two rings are para oriented with respect to each other along the molecular chain. Preferably copolymers have no more than 10 percent of other diamines substituted for a primary diamine used in forming the polymer or no more than 10 percent of other diacid chlorides substituted for a primary diacid chloride used in forming the polymer. Additives can be used with the aramid; and it has been found that up to as much as 13 percent by weight of other polymeric material can be blended or bonded with the aramid. The preferred para-aramids are poly(para-phenylene terephthalamide)(PPD-T) and its copolymers. The preferred meta-aramids are poly(meta-phenylene isophthalamide)(MPD-I) and its copolymers.

Optional Other Additives

Other additives can optionally be added as long as they stay suspended in the slurry in the mixing step and do not significantly change the effect of the refining step on the mandatory solid ingredients listed above. Suitable additives include pigments, dyes, anti-oxidants, flame-retardant compounds, and other processing and dispersing aids. Preferably, the pulp ingredients do not include asbestos. In other words, the resulting pulp is asbestos free or without asbestos.

Water

Water is added to a concentration of 95 to 99 wt % of the total ingredients, and preferably 97 to 99 wt % of the total ingredients. Further, the water can be added first. Then other ingredients can be added at a rate to optimize dispersion in the water while simultaneously mixing the combined ingredients.

Mixing Step

In the mixing step, the ingredients are mixed to a substantially uniform slurry. By "substantially uniform" is meant that random samples of the slurry contain the same wt % of the concentration of each of the starting ingredients as in the total ingredients in the combination step plus or minus 10 wt %, preferably 5 wt % and most preferably 2 wt %. For instance, if the concentration of the solids in the total mixture is 50 wt % meta-aramid fibrids plus 50 wt % para-aramid fiber, then a substantially uniform mixture in the mixing step means each random sample of the slurry has (1) a concentration of the meta-aramid fibrids of 50 wt % plus or minus 10 wt %, preferably 5 wt % and most preferably 2 wt % and (2) a concentration of para aramid fiber of 50 wt % plus or minus 10 wt %, preferably 5 wt % and most preferably 2 wt %. The mixing can be accomplished in any vessel containing rotating blades. The mixing can occur after the ingredients are added or while the ingredients are being added or combined.

Refining Step

In the refining step the pulp ingredients are simultaneously co-refined, converted or modified as follows. The meta-aramid fibrids are sheared and/or masticated, into fibril free, refined meta-aramid fibrids having an average maximum dimension of 0.1 to 0.5 mm. The para-aramid floc is fibrillated, cut and masticated to irregularly shaped fibrous structures having stalks and fibrils. All solids are dispersed such that the refined slurry is substantially uniform. "Substantially uniform" is as defined above. The refining step preferably comprises passing the mixed slurry through one or more disc refiner, or recycling the slurry back through a single refiner. By the term "disc refiner" is meant a refiner containing one or more pair of discs that rotate with respect to each other thereby refining ingredients by the shear action between the discs. In one suitable type of disc refiner, the slurry being refined is pumped between closely spaced circular rotor and stator discs rotatable with respect to one another. Each disc has a surface, facing the other disc, with at least partially radially extending surface grooves. A preferred disc refiner that can be used is disclosed in U.S. Pat. No. 4,472,241.

In a preferred embodiment, the plate gap setting for the disc refiner is a maximum of 0.18 mm and preferably the gap setting is 0.13 mm or lower, to a practical minimum setting of about 0.05 mm.

If necessary for uniform dispersion and adequate refining, the mixed slurry can be passed through the disc refiner more than once or through a series of at least two disc refiners. When the mixed slurry is refined in only one refiner, there is a tendency for the resulting slurry to be inadequately refined and non uniformly dispersed. Conglomerates or aggregates entirely or substantially of one solid ingredient, or the other, or both, can form rather than being dispersed forming a substantially uniform dispersion. Such conglomerates or aggregates have a greater tendency to be broken apart and dispersed in the slurry when the mixed slurry is passed through the refiner more than once or passed through more than one refiner. Optionally, the refined slurry may be passed through a screen to segregate long fibers or clumps, which may be recycled through one or more refiners until cut to acceptable lengths or concentration.

Because a substantially uniform slurry containing multiple ingredients is co-refined in this step of the process, any one type of pulp ingredient (for example, para-aramid fiber) is refined into a pulp in the presence of all the other types of pulp ingredients (for example, meta-aramid fibrids) while those other ingredients are also being refined. This co-refining of pulp ingredients forms a pulp that is superior to a pulp blend generated by merely mixing pulp and fibrids together. Adding pulp and fibrids together and then merely mixing them together does not form the substantially uniform, intimately connected, fibrous components of the pulp generated by co-refining of pulp ingredients into pulp in accordance with the present invention.

Removing Step

Then water is removed from the refined slurry, and in some embodiments the resulting pulp has no more than 60 total wt % water, preferably 4 to 60 total wt % water. The water can be removed by collecting the pulp on a dewatering device such as a horizontal filter, and if desired, additional water can be removed by applying pressure or squeezing the pulp filter cake. The dewatered pulp can optionally then be dried to a desired moisture content, and/or can be packaged or wound up on rolls. In some embodiments, no more than about 60 total wt % water being present is a desired amount of water and preferably 4 to 60 total wt % water. However, in some embodiments, the pulp can retain more water, so higher amounts of total water, as much as 75 total wt % water, will be present.

Figure 1:
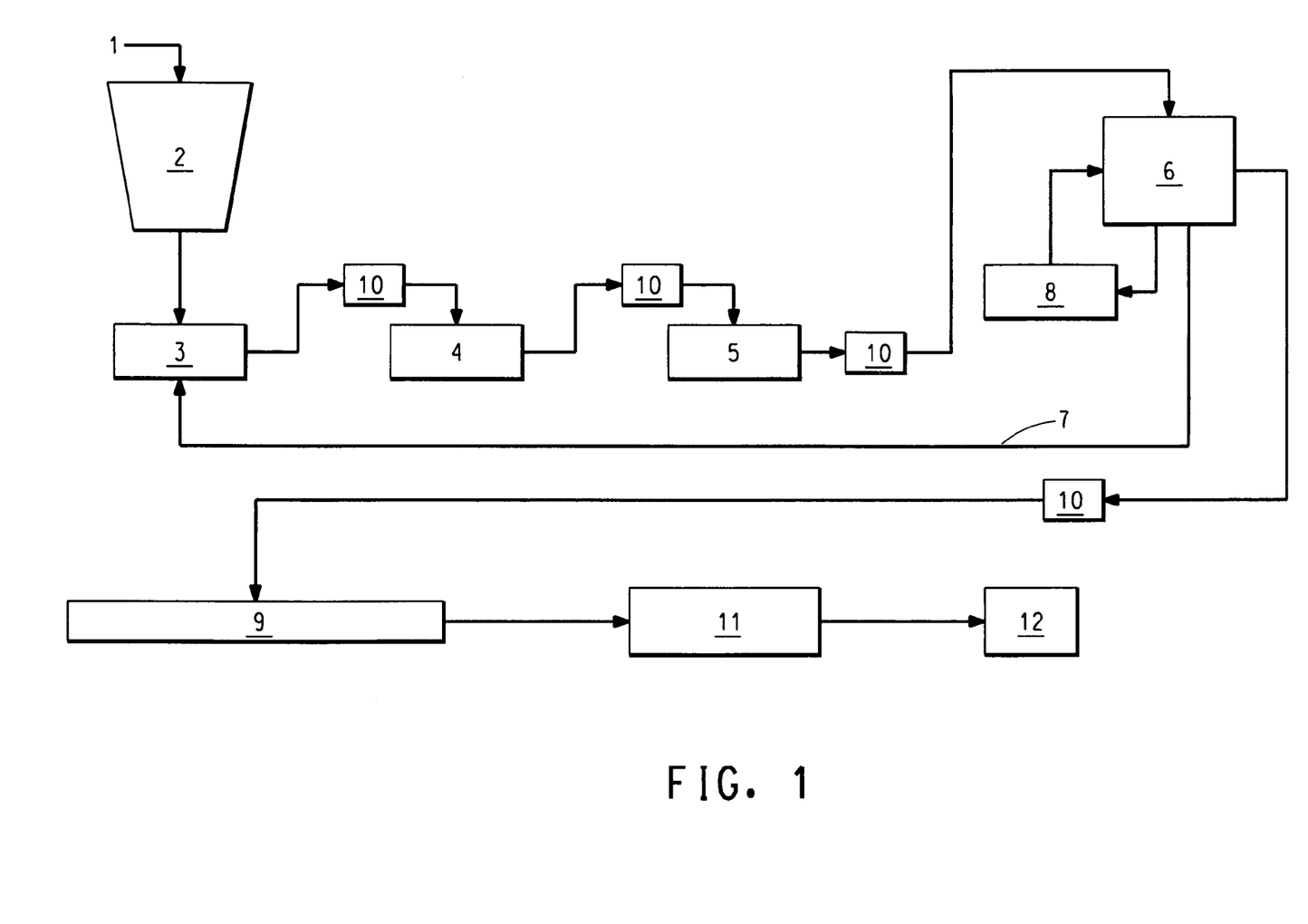
FIG. 1 is a block diagram of apparatus for performing a wet process for making "wet" aramid pulp in accordance with the present invention.
Figure 2:
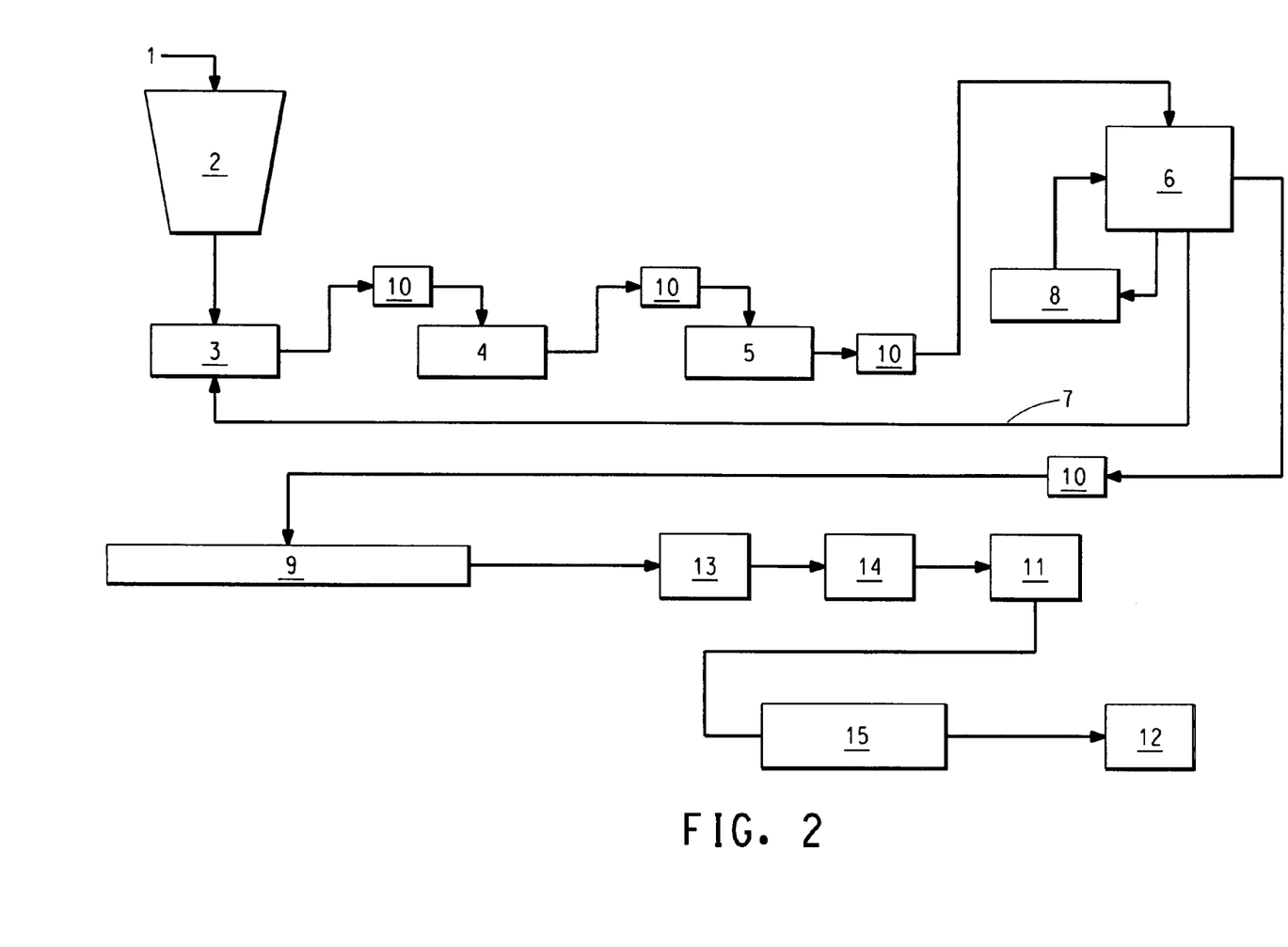
FIG. 2 is a block diagram of apparatus for performing a dry process for making "dry" aramid pulp in accordance with the present invention.

FIGS. 1 and 2

This process will now be described in reference to FIGS. 1 and 2. Throughout this detailed description, similar reference characters refer to similar elements in all figures of the drawings.

Referring to FIG. 1, there is a block diagram of an embodiment of a wet process for making "wet" aramid pulp in accordance with the present invention. Pulp ingredients 1 are added to container 2. Container 2 is provided with an internal mixer, similar to a mixer in a washing machine. The mixer disperses the ingredients into the water creating the substantially uniform slurry. The mixed slurry is transferred to a first refiner 3 that refines the slurry. Then, optionally, the refined slurry can be transferred to a second refiner 4, and optionally then to a third refiner 5. Three refiners are illustrated but any number of refiners can be used depending on the degree of uniformity and refining desired. After the last refiner in the series of refiners, the refined slurry is optionally transferred to a filter or sorter 6 that allows slurry with dispersed solids below a chosen mesh or screen size to pass and recirculates dispersed solids larger than a chosen mesh or screen size back to one or more of the refiners such as through line 7 or to a refiner 8 dedicated to refine this recirculated slurry from which refined slurry is again passed to the filter or sorter 6. Suitably refined slurry passes from the filter or sorter 6 to a horizontal water vacuum filter 9 that removes water such that the pulp has a concentration of water of no more than 75 wt % of the total ingredients. Slurry can be transferred from point to point by any conventional method and apparatus such as with the assistance of one or more pump 10. Then the pulp is conveyed to a dryer 11 that removes more water until the pulp has a concentration of water of no more than 60 wt % of the total ingredients. Then the refined pulp is packaged in a baler 12.

Referring to FIG. 2, there is a block diagram of an embodiment of a dry process for making "dry" aramid pulp in accordance with the present invention. This dry process is the same as the wet process except after the horizontal water vacuum filter 9. After that filter, the pulp goes through a press 13 that removes more water until the pulp has the desired concentration of water. Then the pulp goes through a fluffer 14 to fluff the pulp and then a dryer 11 to remove more water. Then, the pulp is passed through a rotor 15 and packaged in a baler 12.

II. Second Embodiment of the Inventive Process

In a second embodiment, the process for making the para-aramid pulp including meta-aramid fibrids is the same as the first embodiment of the process described above with the following differences. Instead of combining all the pulp ingredients together at once, the ingredients can be added in stages. For instance, some or all of the water needed for all ingredients can be combined with either the (i) meta-aramid fibrids or the (ii) para-aramid floc. These ingredients are mixed to a first substantially uniform suspension. Then the suspension is refined. If the suspension includes meta-aramid fibrids, the refining includes shearing and/or masticating the meta-aramid fibrids. If the suspension includes para-aramid fiber, the refining includes fibrillating, cutting and masticating at least some of the para-aramid fiber to irregularly shaped fibrillated fibrous structures. Then, more water is added, if necessary, to increase the water content to 95-99 wt % of the total ingredients. The other ingredient, that was not previously added, of the (i) meta-aramid fibrids or the (ii) para-aramid fiber is now added. If water is added, this other ingredient can be added before, after or with the additional water. Then, all ingredients are mixed, if necessary, to form a substantially uniform slurry. The slurry is then co-refined together, i.e., simultaneously. If meta-aramid fibrids were refined in the first refining step, this co-refining step includes additional shearing and/or masticating at least some of the meta-aramid fibrids, such that all or substantially all of the meta-aramid fibrids are converted into fibril free, meta-aramid fibrids having an average maximum dimension of 0.1 to 0.5 mm If para-aramid fiber was refined in the first refining step, this second refining step includes fibrillating, cutting and masticating at least some of the para-aramid fiber such that all or substantially all of the para-aramid fiber is converted to irregularly shaped fibrillated fibrous structures. This co-refining step also includes dispersing all solids such that the refined slurry is substantially uniform. Then water is removed as in the first embodiment of the process. Both processes produce the same or substantially the same para-aramid pulp including meta-aramid fibrids.

The Inventive Pulp

The resulting product produced by the process of this invention is a para-aramid pulp including meta-aramid fibrids for use as reinforcement material in products. The pulp comprises (a) fibril free, refined meta-aramid fibrids, (b) irregularly shaped, para-aramid fibrillated fibrous structures, (c) optionally other minor additives, and (e) water.

The concentration of the separate solid ingredient components in the pulp correspond, of course, to the concentrations described beforehand of the corresponding solid ingredients used in making the pulp. Preferably, the fibril free, refined meta-aramid fibrids and the irregularly shaped, para-aramid fibrillated fibrous structures have a length weighted average length of no more than 1.3 mm.

The irregularly shaped, para-aramid fibrillated fibrous structures have stalks and fibrils. The fibrils are important and act as hooks or fasteners or tentacles that adhere to and hold adjacent particles in the pulp and final product thereby providing integrity to the final product. The para-aramid fibrillated fibrous structures preferably have an average maximum dimension of no more than 5 mm, more preferably 0.1 to 5 mm, and most preferably 0.1 to 3 mm. The para-aramid fibrous structures contact and are wrapped partially around at least some of the meta-aramid fibrids.

Where the para-aramid fibrillated fibrous structures contact and are wrapped partially around the refined meta-aramid fibrids the two components can contact at more than one point; they can, but do not need to continuously contact one another along the entire curved path between the components. For instance, fibrils on and along the para-aramid fibrous structures can contact and form a partial cocoon around the meta-aramid fibrids where the para-aramid fibrous structures partially wrap around the meta-aramid fibrids. Preferably, the para-aramid fibrous structures contact and are wrapped partially around at least 25%, preferably 50%, and most preferably 75% of the meta-aramid fibrids.

The para-aramid pulp including meta-aramid fibrids has a Canadian Standard Freeness (CSF) as measured per TAPPI test T 227 om-92, which is a measure of its drainage characteristics, of 100 to 700 ml, and preferably 250 to 450 ml.

Surface area of pulp is a measure of the degree of fibrillation and influences the porosity of the product made from the pulp. Preferably, the surface area of pulp of this invention is 12 to 50 square meters per gram.

It is believed that para-aramid pulp including meta-aramid fibrids, dispersed substantially homogeneously throughout the reinforcement material and the friction and sealing materials, provide, by virtue of the high temperature characteristics of the meta- and para-aramid polymers and the fibrillation propensity of the para-aramid polymer, many sites of reinforcement and increased wear resistance. Therefore, when co-refined, the aramid materials are in such intimate contact that in a friction or sealing material there are always some para-aramid fibrous structures close to the meta-aramid particles, so the stresses and abrasion of service are always shared.

Fluid Sealing Material

The invention is further directed to fluid sealing material and processes for making the sealing materials. Sealing materials are used in or as a barrier to prevent the discharge of fluids and/or gases and used to prevent the entrance of contaminants where two items are joined together. An illustrative use for sealing material is in gaskets. The sealing material comprises a binder; optionally at least one filler; and a fibrous reinforcement material comprising the para-aramid pulp including meta-aramid fibrids of this invention. Suitable binders include nitrile rubber, butadiene rubber, neoprene, styrene-butadiene rubber, nitrile-butadiene rubber, and mixtures thereof. The binder can be added with all other starting materials. The binder is typically added in the first step of the gasket production process, in which the dry ingredients are mixed together. Other ingredients optionally include uncured rubber particles and a rubber solvent, or a solution of rubber in solvent, to cause the binder to coat surfaces of the fillers and pulp. Suitable fillers include barium sulfate, clays, talc, and mixtures thereof.

Suitable processes for making sealing materials are, for example, a beater-add process or wet process where the gasket is made from a slurry of materials, or by what is called a calendering or dry process where the ingredients are combined in an elastomeric or rubber solution.

Friction Material

The pulp of the present invention can be used as a reinforcement material in friction materials. By "friction materials" is meant materials used for their frictional characteristics such as coefficient of friction to stop or transfer energy of motion, stability at high temperatures, wear resistance, noise and vibration damping properties, etc. Illustrative uses for friction materials include brake pads, brake blocks, dry clutch facings, clutch face segments, brake pad backing/insulating layers, automatic transmission papers, and friction papers.

In view of this new use, the invention is further directed to friction material and processes for making the friction material. Specifically, the friction material comprises a friction modifier; optionally at least one filler; a binder; and a fibrous reinforcement material comprising the para-aramid pulp including meta-aramid fibrids of this invention. Suitable friction modifiers are metal powders such as iron, copper and zinc; abrasives such as oxides of magnesium and aluminum; lubricants, such as synthetic and natural graphites, and sulfides of molybdenum and zirconium; and organic friction modifiers such as synthetic rubbers and cashew nut shell resin particles. Suitable binders are thermosetting resins such as phenolic resins (i.e., straight (100%) phenolic resin and various phenolic resins modified with rubber or epoxy), melamine resins, epoxy resins and polyimide resins, and mixtures thereof. Suitable fillers include barite, calcium carbonate, wollastonite, talc, various clays, and mixtures thereof.

The actual steps for making the friction material can vary, depending on the type of friction material desired. For example, methods for making molded friction parts generally involve combining the desired ingredients in a mold, curing the part, and shaping, heat treating and grinding the part if desired. Automotive transmission and friction papers generally can be made by combining the desired ingredients in a slurry and making a paper on a paper machine using conventional paper making processes.

Many other applications of the pulp are possible, including its use as a component in papers, or its use as a filter material. When used as a paper or filter material typically the pulp of this invention is combined with a binder and a sheet or paper product is made by conventional methods.

Test Methods

The following test methods were used in the following Examples.

Canadian Standard Freeness (CSF) is a well-known measure of the facility for water to drain from a slurry or dispersion of particles. Freeness is determined by TAPPI test T227. Data obtained from conduct of that test are expressed as Canadian Standard Freeness Numbers, which represent the milliliters of water that drain from an aqueous slurry under specified conditions. A large number indicates a high freeness and a high tendency for water to drain. A low number indicates a tendency for the dispersion to drain slowly. The freeness is inversely related to the degree of fibrillation of the pulp, since greater numbers of fibrils reduce the rate at which water drains through a forming paper mat.

Fiber length (arithmetic mean length, weight-weighted mean length, and length weighted mean length) was measured in accordance with TAPPI Test Method T 271 using the Fiber Quality Analyzer manufactured by OpTest Equipment Inc.

Temperature: All temperatures are measured in degrees Celsius (° C.).

Denier is measured according to ASTM D 1577 and is the linear density of a fiber as expressed as weight in grams of 9000 meters of fiber. The denier is measured on a Vibroscope from Textechno of Munich, Germany. Denier times (10/9) is equal to decitex (dtex).

EXAMPLES

This invention will now be illustrated by the following specific examples. All parts and percentages are by weight unless otherwise indicated. Examples prepared according to the process or processes of the current invention are indicated by numerical values. Comparative examples are indicated by letters.

Example 1

In this example, the pulp of this invention was produced from a feedstock of para-aramid fiber and meta-aramid fibrids. The para-aramid fiber was poly (para-phenylene terephthalamide) floc having a linear density of about 0.16 tex and cut length of about 6.7 mm (sold by E.I. de Pont de Nemours and Company under trademark KEVLAR® 49). The meta-aramid fibrids were prepared from poly (meta-phenylene isophthalamide) as described in U.S. Pat. No. 3,756,908, and had CSF of about 488 ml, arithmetic mean length of about 0.40 mm, length weighted mean length of about 0.77 mm, and weight weighted mean length of about 1.19 mm.

The meta-aramid fibrids were dispersed in water into a highly agitated mixing tank for about 5 minutes, then the para-aramid fiber was added to make a solids concentration of 50 wt % para-aramid fiber and 50 wt % meta-aramid fibrids and mixed for an additional 10 minutes to form a uniform, pumpable slurry with the total volume of about 156 liters and of about 1.5 wt % of the total ingredients concentration. The slurry was then recirculated and co-refined through a Sprout-Waldron 12" Single Disc Refiner using 0.13 mm plate gap setting at flow of about 43 liters per minute for time of about 27 minutes.

The properties of the final pulp are shown in Table 1.

Example 2

The pulp was produced similar to Example 1, but with solids concentration of 75 wt % para-aramid fiber and 25 wt % meta-aramid fibrids.

The properties of the final pulp are shown in Table 1.

Example 3

The pulp was produced similar to Example 1, but with solids concentration of 25 wt % para-aramid fiber and 75 wt % meta-aramid fibrids.

The properties of the final pulp are shown in Table 1.

Example 4

The pulp of this invention was produced from a feedstock of para-aramid fiber, meta-aramid fibrids, and carbon fiber. The para-aramid fiber was poly (para-phenylene terephthalamide) floc having a linear density of about 0.16 tex and cut length of about 0.67 cm (sold by E.I. de Pont de Nemours and Company under trademark KEVLAR® 49). The meta-aramid fibrids were prepared the same as in Example 1. The carbon fiber was PAN-based FORTAFIL® 150 carbon fiber (about 3 mm long) sold by Toho Tenax America, Inc.

The meta-aramid fibrids were dispersed in water into a highly agitated mixing tank for about 5 minutes, then the para-aramid fiber was added and mixed for an additional 10 minutes to form a uniform, pumpable slurry with the total volume of about 117 liters and of about 1.4 wt % of the total ingredients concentration. The slurry was then recirculated and co-refined through a Sprout-Waldron 12" Single Disc Refiner using 0.13 mm plate gap setting at flow of about 43 liters per minute for time of about 22.5 minutes. After that, the carbon fiber was added into the tank and mixed for an additional 5 minutes to form a uniform, pumpable slurry with the solids concentration 50 wt. % of para-aramid fiber, 25 wt. % of meta-aramid fibrids, and 25 wt. % of carbon fiber with the total volume of about 156 liters and of about 2 wt % of the total ingredients concentration. The slurry was then recirculated and co-refined through the same refiner at the same settings for 1 min.

The properties of the final pulp are shown in Table 1.

Example 5

The pulp was produced similar to example 4, but with a time of 3 minutes of recirculation and co-refining after the addition of the carbon fiber.

The properties of the final pulp are shown in Table 1.

Example 6

The pulp of this invention was produced from a feedstock of para-aramid fiber, meta-aramid fibrids, and glass fiber. The para-aramid fiber was poly (para-phenylene terephthalamide) floc having a linear density of about 0.16 tex and cut length of about 0.67 cm (sold by E.I. de Pont de Nemours and Company under trademark KEVLAR® 49). The meta-aramid fibrids were prepared from poly (meta-phenylene isophthalamide) as described in Example 1. The glass fiber was E-glass fiber about 6.5 micrometers in diameter and about 6.4 mm long supplied by Johns Manville Co.

The meta-aramid fibrids were dispersed in water into a highly agitated mixing tank for about 5 minutes, then the para-aramid fiber was added fibrids and mixed for an additional 10 minutes to form a uniform, pumpable slurry with the total volume of about 117 liters and of about 1.4 wt % of the total ingredients concentration. The slurry was then recirculated and co-refined through a Sprout-Waldron 12" Single Disc Refiner using 0.13 mm plate gap setting at flow of about 43 liters per minute for time of about 22.5 minutes. After that, the glass fiber was added into the tank and mix for an additional 5 minutes to form a uniform, pumpable slurry with the solids concentration 50 wt. % of para-aramid fiber, 25 wt. % of meta-aramid fibrids, and 25 wt. % of glass fiber with the total volume of about 156 liters and of about 1.4 wt % of the total ingredients concentration. The slurry was then recirculated and co-refined through the same refiner at the same settings for 3 min.

The properties of the final pulp are shown in Table 1.

Example 7

The pulp was produced similar to example 6, but with 5 minutes of recirculation and co-refining after the addition of the glass fiber.

The properties of the final pulp are shown in Table 1.

Example 8

The pulp was produced similar to example 7, but the glass fiber used was 210x borosilicate glass fiber type 253 with a mean diameter of about 3 micrometers, supplied by Johns Manville Co.

The properties of the final pulp are shown in Table 1.

Example 9

5 g (of the dry weight) of the pulp produced in Example 1 was placed with 0.5 grams of meta-aramid floc and about 2500 g water in a standard pulp disintegrator as described in Appendix A of TAPPI 205 and agitated for 3 minutes. The dispersion was poured into an approximately 21×21 cm handsheet mold and mixed with additional 5000 g of water. The resulting slurry had the following weight percent of solid materials:

50/50 para-aramid fiber/meta-aramid fibrids pulp 90.9%;
meta-aramid floc 9.1%.

A wet-laid sheet was formed. The sheet was placed between two pieces of blotting paper, hand couched with a rolling pin, and dried in a handsheet dryer at 190 C.

The dried sheet was covered on both sides with an aluminum foil treated with a mold release Mono-Coat® 327W (sold by Chem-Trend Inc.) and compressed in the hot press at temperature 327 C and pressure 3.5 MPa for 2 minutes.

The composition and properties of the final paper are shown in Table 2.

Comparative Example A

A pulp was produced in the same manner as Example 1, but the pulp feedstock was made from 100% of the KEVLAR® fiber.

The properties of the final pulp are shown in Table 1

Comparative Example B

A pulp was produced in the same manner as Example 1, but the pulp feedstock was made from 100% of meta-aramid fibrids.

The properties of the final pulp are shown in Table 1.

Comparative Example C

A pulp was produced in the same manner as Example 1, but the meta-aramid fibrids were preliminary refined as described in U.S. Pat. No. 3,756,908 and had CSF of about 64 ml, arithmetic mean length of about 0.26 mm, length weighted mean length of about 0.47 mm, and weight weighted mean length of about 0.82 mm.

The properties of the final pulp are shown in Table 1.

Comparative Example D

The pulp produced in Comparative Example A was blended at 1:1 wt. ratio with the pulp produced in Comparative Example B using a standard pulp disintegrator (described in TAPPI Test Method T205 sp-95) for 5 minutes.

The properties of the final pulp are shown in Table 1.

Comparative Example E

The pulp produced in Comparative Example A was blended at 1:1 wt. ratio with the meta-aramid fibrids from poly (meta-phenylene isophthalamide), which were preliminary refined as described in U.S. Pat. No. 3,756,908 and had CSF of about 64 ml, arithmetic mean length of about 0.26 mm, length weighted mean length of about 0.47 mm, and weight weighted mean length of about 0.82 mm, using a standard pulp disintegrator (described in TAPPI Test Method T205 sp-95) for 5 minutes.

The properties of the final pulp are shown in Table 1.

Comparative Example F

A pulp was produced in the same manner as Example 5, but with 5 minutes of recirculation and co-refining after the addition of the carbon fiber.

The properties of the final pulp are shown in Table 1.

Comparative Example G

A paper sample was made as in Example 9, but using the pulp from Comparative Example E.

The paper composition and properties are shown in Table 2.

As can be understood from Examples 1-3, about a 50:50 ratio between the para-aramid fiber and the meta-aramid fibrids gives the best-refined (low freeness) pulp. Such pulp has a lower freeness than a pulp from 100% para-aramid fiber (Comparative Example A) or a pulp from 100% meta-aramid fibrids (Comparative Example B) produced at the same conditions or from a pulp prepared by blending the pulps of Comparative Examples A and B (Comparative Example D). As such, there is some unexpected synergistic effect, which was not disclosed in the prior art. The para-aramid fiber promotes refining of the meta-aramid fibrids when the two are co-refined. The degree of refining of such pulp from Example 1 is very close to that achieved by the blending of well-refined fibrids (using a special refining process for them) and well-refined para-aramid fiber (Comparative Example C). However, the co-refined pulp was produced in one step, with savings of energy and other cost factors. Moreover, the co-refining process generated a more uniform composite structure, as discussed below regarding Example 9 and Comparative Example G.

Examples 4-8 demonstrate a preparation and properties of pulps produced by co-refining of a feedstock comprising para-aramid fiber, never dried meta-aramid fibrids and some additional fibers. Both types of additional fibers (carbon and glass) that are used are brittle. Their brittle nature is the reason they were added in the second stage of the co-refining process. Such fibers do not fibrillate in refining therefore the freeness increases with their addition and then decreases due to the reduction of their length in refining.

Comparative Example F shows that if the pulp containing carbon fiber is refined for relatively long time, that fiber will be crushed and the freeness will be as low as for the pulp without the addition of carbon fiber.

Example 9 and Comparative Example G demonstrate that co-refined pulp provides a more uniform distribution of components in contrast to blended pulp, which results in density difference for papers produced at the same conditions (the paper based on co-refined pulp has higher density). More uniform distribution of the components should provide better performance of the final composite structure in any end-use (frictional elements, gaskets, structural composites, etc).

Example 10

Disc brake pads incorporating the pulp of this invention are made in the following manner. Approximately 20 kilograms of a non-asbestos-containing base compound powder comprising a mixture of 7 wt % cashew nut shell resin, 17 wt % inorganic fillers, 21 wt % graphite, coke and lubricants, 18 wt % inorganic abrasives, and 16 wt % soft metals are mixed together for 10 to 20 minutes in a 50-liter Littleford mixer. The mixer has two high-speed choppers with blades of the "stars and bars" configuration and a slower rotating plough.

5 kilograms of the well-blended base compound powder are then combined with the pulp of this invention (a co-refined pulp being 50 wt % para-aramid and 50 wt % meta-aramid) in an amount of 3.8 wt %, based on the combined weight of the compound and the pulp. The pulp is then dispersed in the base compound by mixing for an additional 5 to 10 minutes.

The brake pad composition is then poured into a single-cavity steel mold for a front disc brake pad and cold pressed to a standard thickness of about ⅝ inch (16 mm) and then removed from the mold to form a pre-formed brake pad having an approximate weight of 200 grams. Twelve replicate pre-forms are made. The pre-forms are then placed in two multi-cavity molds, placed in a commercial press, and press-cured (the binder phenolic cross-linking and reacting) at 300° F. (149° C.) for about 15 minutes, with periodic pressure release to allow phenolic reaction gases to escape, followed by lightly constrained oven curing at 340° F. (171° C.) for 4 hours to complete the phenolic binder crosslinking. The cured, molded pads are then ground to the desired thickness of about half an inch (13 mm).

Example 11

This example illustrates how the pulp of this invention can be incorporated into a beater-add gasket for sealing applications. Water, rubber, latex, fillers, chemicals, and the pulp of this invention are combined in desired amounts to form a slurry. In this example, the pulp is made of 50 wt % of pieces of meta-aramid uncalendered paper plus 50 wt % para-aramid fiber. On a circulating wire sieve (such as a paper machine screen or wire), the slurry is largely drained of its water content, is dried in a heating tunnel, and is vulcanized on heated calender rolls to form a material having a maximum thickness of around 2.0 mm.

Such beater-add gasket materials generally do not have as good sealability as equivalent compressed-fiber materials and are best suited for moderate-pressure high-temperature applications. Beater-add gaskets find applicability in the making of auxiliary engine gaskets or, after further processing, cylinder head gaskets. For this purpose, the semi-finished product is laminated onto both sides of a spiked metal sheet and is physically fixed in place by the spikes.

Example 12

This example illustrates how the pulp of this invention can be incorporated into a gasket made by the calendering process. The same ingredients as in Example 4, minus the water, are thoroughly mixed together and are then blended with a rubber solution prepared using an appropriate solvent.

After mixing, the compound is then generally conveyed batchwise to a roll calender. The calender consists of a small roll that is cooled and a large roll that is heated. The compound is fed and drawn into the calender nip by the rotary movement of the two rolls. The compound will adhere and wrap itself around the hot lower roll in layers generally about 0.02 mm thick, depending on the pressure, to form a gasketing material made from the built-up compound layers. In so doing, the solvent evaporates and vulcanization of the elastomer commences. The evaporation rate of the solvent is dependent on the speed of the heated roll; if the speed is too fast, the solvent cannot adequate escape before the next layer of compound is applied, causing blisters in the gasketing material. If the speed is too slow, the material may be too dry to form a adequate bond between successive layers of the gasketing material and delamation can occur.

Once the desired gasketing material thickness is reached, the rolls are stopped and the gasketing material is cut from the hot roll and cut and/or punched to the desired size. No additional pressing or heating is required, and the material is ready to perform as a gasket. In this manner gaskets up to about 7 mm thick can be manufactured. However, most gaskets made in this manner are much thinner, normally being about 3 mm or less in thickness.

TABLE 1

Properties of the pulp samples

| | Pulp composition, wt. % | | | | Mean fiber length in the pulp, mm | | | |
|---|---|---|---|---|---|---|---|---|
| Example | p-aramid fiber | m-aramid fibrids | carbon fiber | glass fiber | Arith. | Length W. | Weight W. | CSF, ml |
| 1 | 50 | 50 | — | — | 0.20 | 0.68 | 1.77 | 177 |
| 2 | 75 | 25 | — | — | 0.20 | 0.62 | 1.41 | 317 |
| 3 | 25 | 75 | — | — | 0.23 | 0.70 | 2.46 | 214 |
| 4 | 50 | 25 | 25 | — | 0.17 | 0.45 | 1.24 | 421 |
| 5 | 50 | 25 | 25 | — | 0.17 | 0.43 | 1.06 | 324 |
| 6 | 50 | 25 | — | 25 | 0.19 | 0.57 | 1.62 | 424 |
| 7 | 50 | 25 | — | 25 | 0.19 | 0.56 | 1.54 | 358 |
| 8 | 50 | 25 | — | 25 | 0.19 | 0.53 | 1.33 | 439 |
| Comp. A | 100 | — | — | — | 0.20 | 0.54 | 1.29 | 249 |
| Comp. B | — | 100 | — | — | 0.39 | 0.79 | 1.38 | 207 |
| Comp. C | 50 | 50 | — | — | 0.18 | 0.57 | 1.67 | 160 |
| Comp. D | 50 | 50 | — | — | 0.26 | 0.68 | 1.35 | 240 |
| Comp. E | 50 | 50 | — | — | 0.21 | 0.55 | 1.50 | 118 |
| Comp. F | 50 | 25 | 25 | — | 0.17 | 0.45 | 1.18 | 291 |

TABLE 2

Properties of the pulp paper sample

| | Pulp composition, wt. % | | Paper composition, wt. % | | Paper density, |
|---|---|---|---|---|---|
| Example | p-aramid fiber | m-aramid fibrids | composite pulp | m-aramid floc | g/cm3 |
| 9 (co-refined pulp) | 50 | 50 | 90.9 | 9.1 | 0.73 |
| Comp. G (blended pulp) | 50 | 50 | 90.9 | 9.1 | 0.70 |

What is claimed is:

1. A process for making a para-aramid pulp including meta-aramid fibrids for use as reinforcement material, comprising:
    (a) combining pulp ingredients including:
        (1) never-dried meta-aramid fibrids having an average maximum dimension of 0.2 to 1 mm, a ratio of maximum to minimum dimension of 5:1 to 10:1, and a thickness of no more than 2 micrometers, and being a 10 to 90 weight percent of the total solids in the ingredients;
        (2) para-aramid fiber being 10 to 90 weight percent of the total solids in the ingredients, and having an average length of no more than 10 cm; and
        (3) water being 95 to 99 weight percent of the total ingredients;
    (b) mixing the ingredients to a substantially uniform slurry, wherein random samples of the slurry contain the same wt % of the concentration of each of the starting ingredients as in the total ingredients in the combination step plus or minus 10 wt %
    (c) co-refining the slurry by simultaneously:
        (1) shearing and/or masticating the meta-aramid fibrids into fibril-free refined meta-aramid fibrids having an average maximum dimension of 0.1 to 0.5 mm;
        (2) fibrillating, cutting and masticating the para-aramid fiber to irregularly shaped fibrillated fibrous structures; and
        (3) dispersing all solids such that the refined slurry is substantially uniform; and
    (d) removing water from the refined slurry,
    thereby producing a meta- and para-aramid pulp with the para-aramid fibrous structures contacting and wrapped partially around at least some of the refined meta-aramid fibrids.

2. The process of claim 1, wherein in the combining step, the never-dried meta-aramid fibrids are 25 to 60 weight percent of the total solids.

3. The process of claim 1, wherein in the combining step, the irregularly shaped, para-aramid, fibrous structures are 40 to 75 weight percent of the total solids.

4. The process of claim 1, wherein after the removing step, the pulp has a Canadian Standard Freeness (CSF) of 100 to 700 ml.

5. The process of claim 1, wherein the refining step comprises passing the mixed slurry through a series of disc refiners.

6. The process of claim 1, wherein after the removing step, the meta-aramid refined fibrids and the masticated irregularly shaped para-aramid fibrous structures have a length weighted average length of no more than 1.3 mm.

7. A process for making a para-aramid pulp including meta-aramid fibrids for use as reinforcement material, comprising:
    (a) combining ingredients including water and a first material of the group:
        (1) never-dried meta-aramid fibrids having an average maximum dimension of 0.2 to 1 mm, a ratio of maximum to minimum dimension of 5:1 to 10:1, and a thickness of no more than 2 micrometers and being 10 to 90 weight percent of the total solids in the pulp; and
        (2) para-aramid fiber being 10 to 90 weight percent of the total solids in the pulps, and having an average length of no more than 10 cm;

(b) mixing the ingredients to a substantially uniform suspension, wherein random samples of the slurry contain the same wt % of the concentration of each of the starting ingredients as in the total ingredients in the combination step plus or minus 10 wt %;

(c) refining the mixed suspension by:
   (1) shearing and/or masticating at least some of the meta-aramid fibrids; or
   (2) fibrillating, cutting and masticating at least some of the para-aramid fiber to irregularly shaped fibrillated fibrous structures;

(d) combining ingredients including the refined suspension, the second material of the group of (a) (1 and 2), and water, if necessary, to increase the water concentration to 95-99 weight percent of the total ingredients;

(e) mixing the ingredients, if necessary, to form a substantially uniform slurry;

(f) co-refining the slurry by simultaneously:
   (1) shearing and/or masticating at least some of any remaining never-dried meta-aramid fibrids having an average maximum dimension of 0.2 to 1 mm, an aspect ratio of 5:1 to 10:1, and a thickness of no more than 2 micrometers, such that all or substantially all of the never-dried meta-aramid fibrids are size-reduced into fibril free, meta-aramid refined fibrids having an average maximum dimension of 0.1 to 0.5 mm and
   (2) fibrillating, cutting and masticating at least some of the para-aramid fiber such that all or substantially all of the para-aramid fiber is converted to irregularly shaped fibrillated fibrous structures; and
   (3) dispersing all solids such that the refined slurry is substantially uniform; and (g) removing water from the refined slurry, thereby producing a meta- and para-aramid pulp with the para-aramid fibrous structures contacting and wrapped partially around at least some of the meta-aramid refined fibrids.

8. The process of claim 7, wherein after the removing step, the meta-aramid refined fibrids are about 25 to 60 weight percent of the total solids.

9. The process of claim 7, wherein after the removing step, the irregularly shaped, para-aramid, fibrous structures are 40 to 75 weight percent of the total solids.

10. The process of claim 7, wherein the first refining step comprises passing the mixed suspension through a first disc refiner and the second refining step comprises passing the mixed slurry through a second disc refiner.

11. The process of claim 7, wherein after the removing step, the meta-aramid refined fibrids and the irregularly shaped para-aramid fibrous structures having a length weighted average length of no more than 1.3 mm.

* * * * *